(12) United States Patent
Chen et al.

(10) Patent No.: US 7,739,547 B2
(45) Date of Patent: *Jun. 15, 2010

(54) FAILURE RECOVERY AND ERROR CORRECTION TECHNIQUES FOR DATA LOADING IN INFORMATION WAREHOUSES

(75) Inventors: Ying Chen, San Jose, CA (US); Bin He, San Jose, CA (US); Ana Lelescu, Morgan Hill, CA (US); James J. Rhodes, Los Gatos, CA (US); Rui Wang, ShangDi Beijing (CN)

(73) Assignee: International Business Machines Corporation, Armonk, NY (US)

( * ) Notice: Subject to any disclaimer, the term of this patent is extended or adjusted under 35 U.S.C. 154(b) by 390 days.

This patent is subject to a terminal disclaimer.

(21) Appl. No.: 11/759,856

(22) Filed: Jun. 7, 2007

(65) Prior Publication Data

US 2008/0307255 A1    Dec. 11, 2008

(51) Int. Cl.
     *G06F 11/00*    (2006.01)
(52) U.S. Cl. ......................... 714/15; 707/202
(58) Field of Classification Search ................ None
See application file for complete search history.

(56) References Cited

U.S. PATENT DOCUMENTS

| | | | |
|---|---|---|---|
| 5,933,593 A * | 8/1999 | Arun et al. ................ 714/6 |
| 5,996,088 A | 11/1999 | Frank et al. | |
| 6,343,299 B1 * | 1/2002 | Huang et al. ............. 707/203 |
| 6,351,754 B1 * | 2/2002 | Bridge et al. ............. 707/202 |
| 6,490,657 B1 | 12/2002 | Masubuchi et al. | |
| 6,584,476 B1 * | 6/2003 | Chatterjee et al. ......... 707/203 |
| 6,598,059 B1 * | 7/2003 | Vasudevan et al. ......... 707/203 |
| 6,678,704 B1 * | 1/2004 | Bridge et al. ............. 707/202 |
| 6,728,867 B1 | 4/2004 | Kling | |
| 6,834,358 B2 | 12/2004 | Korenevsky et al. | |
| 6,941,489 B2 | 9/2005 | DeLano | |
| 7,003,560 B1 | 2/2006 | Mullen et al. | |
| 7,017,076 B2 | 3/2006 | Ohno et al. | |
| 7,127,475 B2 | 10/2006 | Gotz et al. | |
| 7,149,761 B2 * | 12/2006 | Cooke et al. ............. 707/203 |
| 7,526,513 B2 * | 4/2009 | Lees et al. ............... 707/201 |
| 2006/0085679 A1 | 4/2006 | Neary et al. | |
| 2006/0218563 A1 | 9/2006 | Grnistein et al. | |
| 2008/0307011 A1 * | 12/2008 | Chen et al. .............. 707/202 |

OTHER PUBLICATIONS

Amer-Yahia et al., "A declarative approach to optimize bulk loading into databases", ACM Transactions on Database Systems (TODS), vol. 29, Issue 2 (Jun. 2004), pp. 233-281; USA.

* cited by examiner

*Primary Examiner*—Christopher S McCarthy
(74) *Attorney, Agent, or Firm*—Shimokaji & Associates P.C.

(57) ABSTRACT

A method of data loading for large information warehouses includes performing checkpointing concurrently with data loading into an information warehouse, the checkpointing ensuring consistency among multiple tables; and recovering from a failure in the data loading using the checkpointing. A method is also disclosed for performing versioning concurrently with data loading into an information warehouse. The versioning method enables processing undo and redo operations of the data loading between a later version and a previous version. Data load failure recovery is performed without starting a data load from the beginning but rather from a latest checkpoint for data loading at an information warehouse level using a checkpoint process characterized by a state transition diagram having a multiplicity of states; and tracking state transitions among the states using a system state table.

3 Claims, 4 Drawing Sheets

FAILURE RECOVERY AND ERROR CORRECTION TECHNIQUES FOR DATA LOADING IN INFORMATION WAREHOUSES

BACKGROUND OF THE INVENTION

The present invention relates generally to the field of information storage and retrieval and, more particularly, to loading data into large information warehouses.

Today's information warehouses are becoming increasingly large, e.g., hundreds of gigabytes (GB) or even terabytes (TB) of structured and unstructured information. Such information warehouses often were built from one or multiple data sources. It is not uncommon that the lengthy process of loading data into the information warehouse would run into various issues (e.g., data loading failures) that may lead to incompleteness or errors of the data loads. Typically, data loading failure and error cases can be classified into two classes: 1) failures and errors that are caused by unexpected system problems, e.g., machine crashes and broken network connections; and 2) data source content that contains "dirty" data, i.e., data that is faulty for whatever reason, e.g., incorrect linkages between data tables. For failures in the first class, such a failure may cause the data loading to be incomplete. An ideal recovery process should be able to resume the data loading from where it was left off rather than starting the data load from scratch, i.e., from the beginning, which is typical of current information warehouse solutions to data loading failures. For failures in the second class, in the case, for example, of data that is already loaded, the data may require cleaning up or reloading, or both, if the data source content contained dirty data.

Better methodologies and tools are needed for coping with the lengthy data loading required for maintaining increasingly large information warehouses.

SUMMARY OF THE INVENTION

In one embodiment of the present invention, a method comprises performing checkpointing concurrently with data loading into an information warehouse, the checkpointing ensuring consistency among multiple tables; and recovering from a failure in the data loading using the checkpointing.

In another embodiment of the present invention, a method comprises performing versioning concurrently with data loading into an information warehouse; and processing an undo operation of the loaded data from a first version to a previous version using the versioning.

In yet another embodiment of the present invention, a method comprises performing failure recovery without starting a data load from the beginning of a source file but rather from a latest checkpoint for data loading using a checkpoint process performed at an information warehouse level, and characterized by a state transition diagram having a plurality of states; and tracking state transitions among the states using a system state table.

In still another embodiment of the present invention, an information warehouse system comprises a source file version table; multiple individual data base (DB) tables each of which contains versioning information in addition to data base information; and a versioning mechanism that accesses the source file version table and any combination of the DB tables to perform update, undo, and redo operations of data loading for an information warehouse.

In still another embodiment of the present invention, a computer program product for use with an information warehouse comprises a computer useable medium including a computer readable program, in which the computer readable program when executed on a computer causes the computer to process a data loading task according to a state transition diagram that has checkpoint states; and track state transitions among states of the state transition diagram using a system state table, wherein in response to a data loading failure: completing the data loading task does not require entirely repeating the data loading task; and completing the data loading task comprises reloading data from a most recent checkpoint state.

In a further embodiment of the present invention, a computer program product for use with an information warehouse comprises a computer useable medium including a computer readable program, wherein the computer readable program when executed on a computer causes the computer to maintain a source file version table including: 1) source data file information for data loading of a plurality of source data files; 2) current version information for each of the source data files; and 3) maximum version information for each of the source data files; maintain a multiplicity of individual data base (DB) tables each of which includes creation version information for each record of each source data file; and perform update, undo, and redo operations of data loading using the source file version table and the DB tables.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide systems and methods for coping with failure recoveries and error corrections during the course of information warehouse data loading. Embodiments of the present invention may be useful to commercial enterprises that build and maintain increasingly large information warehouses to enable advanced information analytics and to improve the "business value" of information. Building and maintaining such a large information warehouse may present issues of data loading and ensuring integrity of loaded data. For example, as data loads into large information warehouses have become increasingly lengthy, the lack of failure recovery provisions in prior art information warehouse tool suites for recovering from data load failures typically requires users of prior art systems, in the face of failures, to rebuild the entire warehouse from scratch, e.g., reload from the beginning of a data load, which can be extremely time-consuming. Also, for example, it is not uncommon that after data are loaded into the information warehouse, there may still be the need to "clean up" some data in the information warehouse if the original source data contain "dirty" data or the data were erroneously loaded. Typical prior art systems lack tools—such as a tool to allow users to selectively "undo" some parts of a data load, and optionally "redo" some part of a data load (following an "undo") after the source data are corrected—to allow users to handle such situations without having to carry out a full data reload.

Embodiments of the present invention may provide a novel information warehouse-level checkpointing mechanism to allow failed data loads to resume from failure points (e.g., a checkpoint established previous to the data loading failure) while maintaining information warehouse consistency and integrity, in contrast to prior art systems that lack the capability to consistently resume a data load from any intermediate point. Such capability of embodiments of the present invention can significantly reduce the time needed to load data in failure conditions compared to prior art systems that must redo the entire data load in case of failure. In addition, some embodiments of the present invention provide a novel versioning mechanism to allow users to "undo" changes made to the information warehouse, and to "redo" or "apply" new changes to the information warehouse without violating information warehouse integrity and consistency, in contrast to prior art systems that lack the versioning mechanism. Versioning in accordance with embodiments of the present invention can avoid complete and lengthy data reloads in a wide range of failure and error conditions that require prior art systems to perform a complete reload of the data. Instead, with embodiments of the present invention, only the affected data needs to be reloaded. Hence data loading in accordance with the present invention can be extremely efficient and robust.

To provide failure recovery without full data reload, an information warehouse system in accordance with an embodiment of the invention may provide checkpointing that supports, for example, the following types of operations: aborting a data load and resuming a data load from where it was left off. Transaction and rollback operations in relational data base management systems (RDBMS) are insufficient for handling failure recovery in information warehouses because data loading for information warehouses typically must deal with loading of very large data files (e.g., a single file with several hundred megabytes or more of data), and information warehouse tools often split one big data file into relatively small blocks (e.g., 1000 records in a block) and use RDBMS to bulk load one block at one time for efficiency reasons. Although the RDBMS transaction mechanism can guarantee the atomicity for each bulk load command, a set of bulk loads might have to be considered as a single transaction (or an atomic unit) to ensure integrity and consistency of the overall information warehouse. Moreover, RDBMS do not support data loading resumption in the sense that if a loading task is interrupted and a user wants to continue the load, the information warehouse management system should be able to load data from the last data loading break point. Checkpointing in accordance with embodiments of the present invention may provide an information warehouse system the capability to automatically record the failure/break points (checkpoints) and allow the system to rollback to the failure point in such a way that the information warehouse maintains its integrity and consistency. Moreover, checkpointing in accordance with embodiments of the present invention may also allow users to resume from the checkpoint without duplicate data loads.

To provide recovery from loading of faulty data or erroneously loading data, an information warehouse system in accordance with an embodiment of the invention may provide versioning that supports operations that, for example, allow users to undo and redo data load operations in case erroneous loads occurred or in case the loaded data contained bad content.

Figure 1:
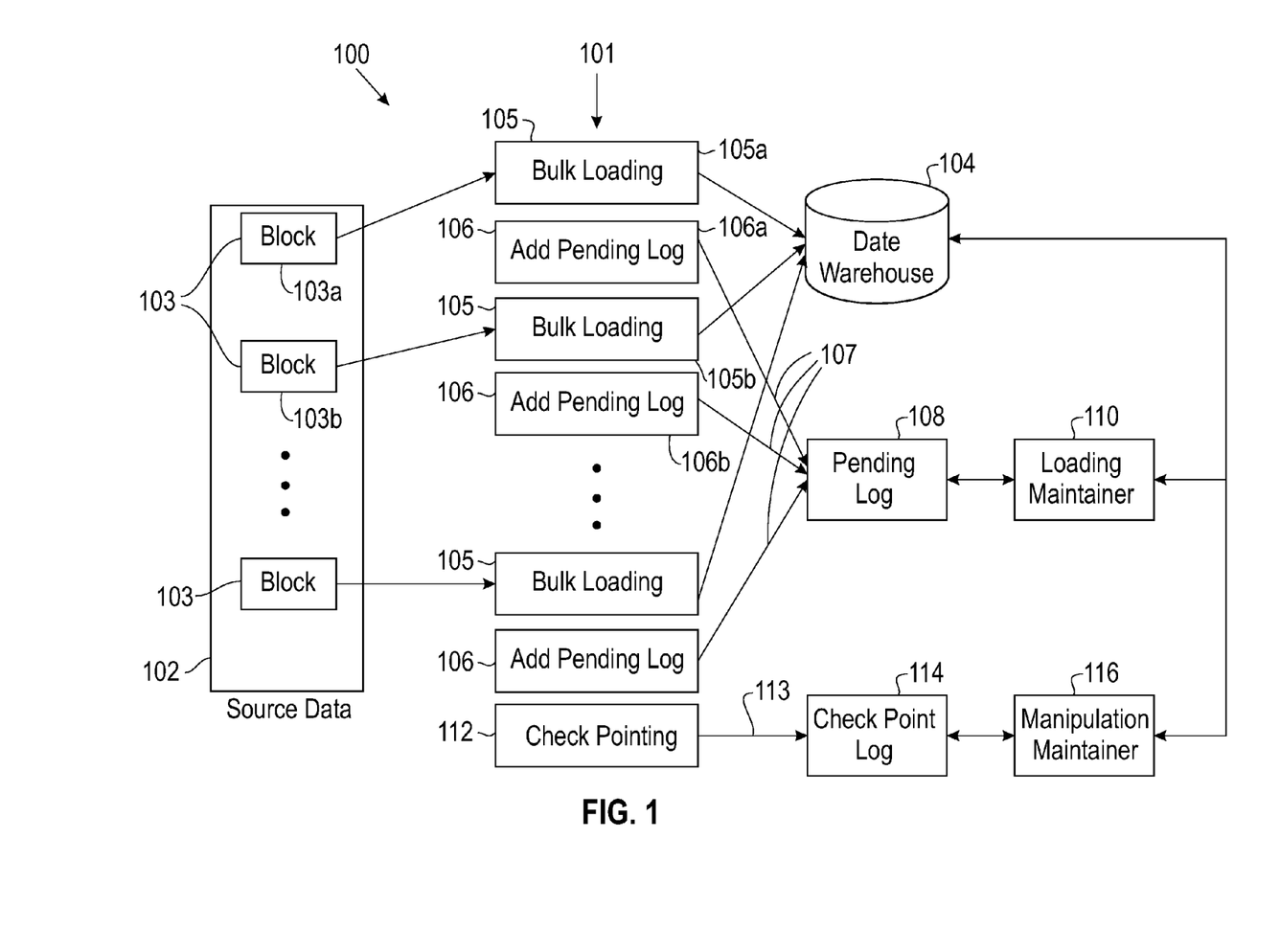
FIG. 1 is a system architecture diagram illustrating a system for failure recovery and error correction for information warehouse data loading in accordance with an embodiment of the present invention.

FIG. 1 illustrates an information warehouse system 100 in accordance with one embodiment of the present invention, showing a high-level system architecture of system 100 for handling information warehouse failure recovery and error correction. Information warehouse system 100 may perform operations 101 for loading large amounts (e.g., multiple gigabytes or terabytes (1,000 GB)) of data 102 (also referred to as "source data" or "data file") into a data warehouse 104 (also referred to as "information warehouse"). During run time (e.g., during execution of computer programs for loading data 102 into data warehouse 104 and performing operations 101 and other functions of system 100), system 100 may split the data file 102 into multiple blocks 103 for efficient relational data base management system (RDBMS) data loads. Each block 103 may be loaded into the data warehouse 104 using a bulk loading operation 105. Before the data file 102 is completely loaded, its status may be set as pending. For example, an add pending log operation 106 may be performed corresponding to each block 103 and bulk loading operation 105. As seen in FIG. 1, pending log operation 106a may correspond to block 103a and bulk loading operation 105a, pending log operation 106b may correspond to block 103b and bulk loading operation 105b, and so forth. System 100 may maintain information from each pending log operation 106 in a pending log 108. The pending log 108 may be, for example, a database into which pending log operations 106 may enter information, as indicated by data flow arrows 107.

The pending log 108 may have a format, for example, as shown by Table 1, also referred to as a "system table" or "system state table".

TABLE 1

| Source data file | Table name | Attribute name | Count | Datetime | State |
|---|---|---|---|---|---|
| a.xml | Fact | Raw_Key | 510 | 10:20:43 10-20-2006 | pending |
| a.xml | Sales.Map | Tab_Key | 502 | 10:16:43 10-20-2006 | pending |
| a.xml | Sales.Dim | Tab_Key | 502 | 10:15:43 10-20-2006 | pending |

Figure 2:
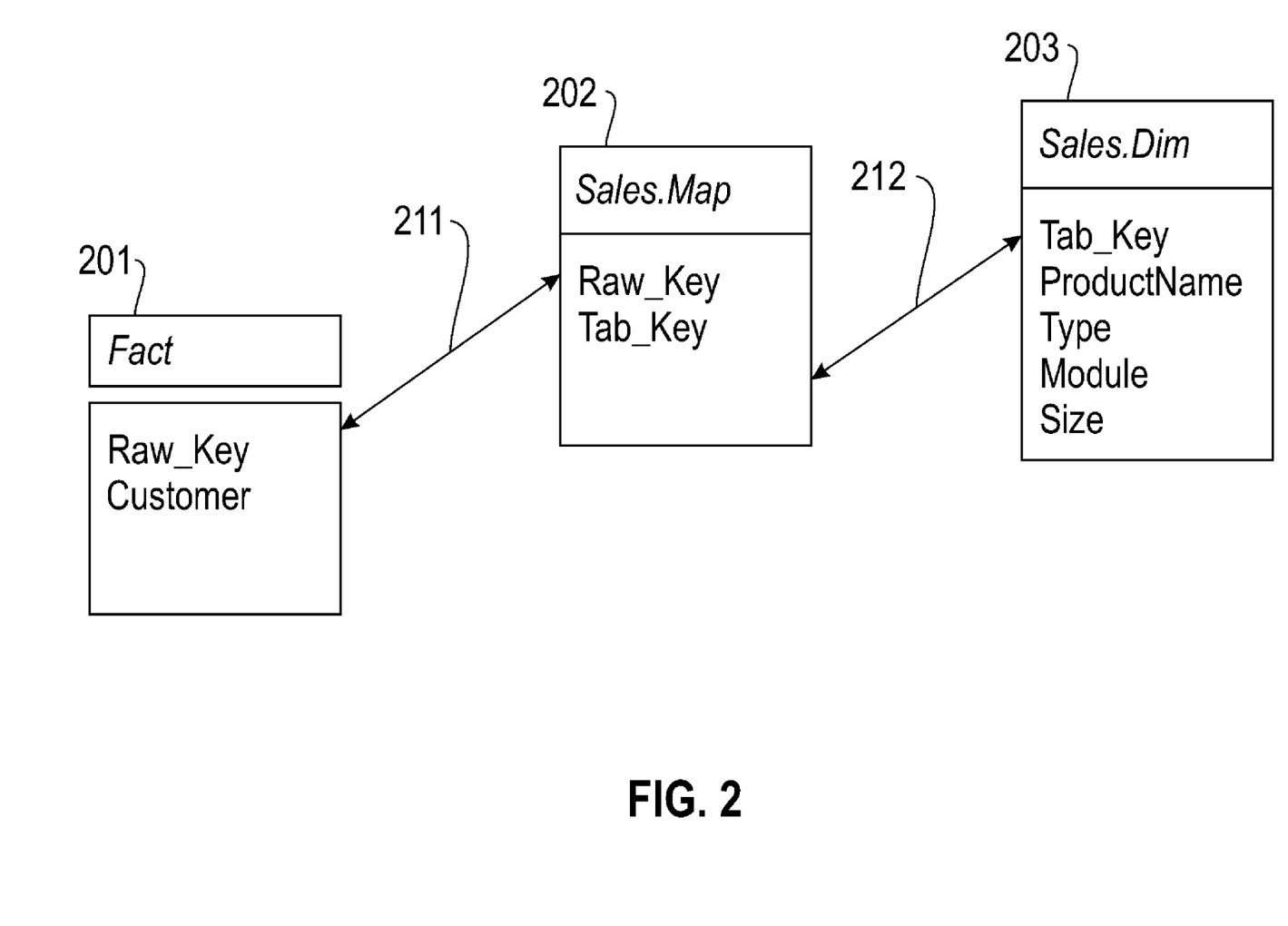
FIG. 2 is a diagram of data tables and their linkages for an illustrative example of data that may be loaded into an information warehouse in accordance with an embodiment of the present invention.

The data in Table 1 illustrate an example in which a source file a.xml (e.g. data file 102) may be loaded into an information warehouse 104, in which there are three tables 201, 202, and 203 as shown in FIG. 2. Table 201 (shown as "Fact"), table 202 (shown as "Sales.Map"), and table 203 (shown as "Sales.Dim") may represent a snowflake information warehouse data model, as known in the art. Tables 201, 202, and 203 may have dependencies that must be maintained at all times for consistency and integrity of the data in information warehouse 104. As shown in FIG. 2, Sales.Map and Sales.Dim may be linked with each other via Tab_Key (link 212 shown in FIG. 2), and Fact and Sales.Map tables may be linked with each other via Raw_Key (link 211 shown in FIG. 2).

Referring again to FIG. 1, after loading (e.g., performing a bulk loading operation 105) each block 103, system 100 may record the number of tuples loaded in the pending log 108. The recording may be performed by the pending log operation 106 corresponding to the block 103, and the number of tuples may be entered in the "Count" column in Table 1, which may represent a format of pending log 108. If the loading is interrupted, the loading maintainer module 110 may use information from the pending log 108 (Table 1) to abort or resume the loading. When the data file 102 is completely loaded, system 100 may perform checkpointing 112. Checkpointing 112 may include recording the current data warehouse status as a new checkpoint into a checkpoint log 114, as indicated in FIG. 1, for example, by data flow arrow 113. A manipulation maintainer module 116 may use information from the checkpoint log 114 to perform undo and redo actions. In summary, pending log 108 may record an intermediate status in the process of loading (e.g., performing operations 101). Checkpoint log 114 may record the data warehouse 104 states when the loading (e.g., performance of operations 101) is completed.

As illustrated by the simplified example shown in FIG. 2, an information warehouse (e.g., data warehouse 104) may contain multiple database tables, e.g., dimension tables—such as table 203, map tables—such as table 202, and facts tables—such as table 201. Such tables may have various forms of dependencies among them, e.g., links 211, 212. When data are loaded into the information warehouse, ensuring the overall integrity and consistency of the information warehouse may require correctly maintaining the dependencies at all times. For instance, in a snowflake data warehouse model, integrity between the dimension table, its map table, and the fact table needs to be maintained for correct loading of data. For example, the fact table's 201 raw_keys must match with the map table's 202 raw_keys, and the fact table 201 should have the same number of tuples (not shown in FIG. 2) as the map table 202. The Sales.Map table 202 may contain tab_keys which should map to the tab_keys in the Sales.dim dimension table 203. If failures occurred during a data load (e.g., a loading operation 105), the system 100 may be able to clean up inconsistent or incomplete records (e.g., tuples) before resuming the data loads (e.g., the remaining loading operations 105). For instance, data might have been loaded into the map table 203, but not its corresponding fact table 201, hence the record may be inconsistent. Furthermore, during data loading resumption, the system 100 may be required to avoid incomplete records or duplicate data loads, i.e., loading the same data twice. There could be an incomplete record, for instance, if half of the record were loaded into the information warehouse 104 and there were no support to clean up the loaded half record. During resumption of data loading, the loaded half record could be reloaded again, hence generating duplicate records in the information warehouse 104. To guarantee data loading without incomplete records or duplicate records, embodiments of the present invention may utilize state transition diagrams (such as state transition diagram 300 shown in FIG. 3 or state transition diagram 400 shown in FIG. 4) to allow an information warehouse system (such as system 100) to track the states of the data in the information warehouse (e.g., information warehouse 104) and record checkpoints (e.g., included in checkpointing 112).

Figure 3:
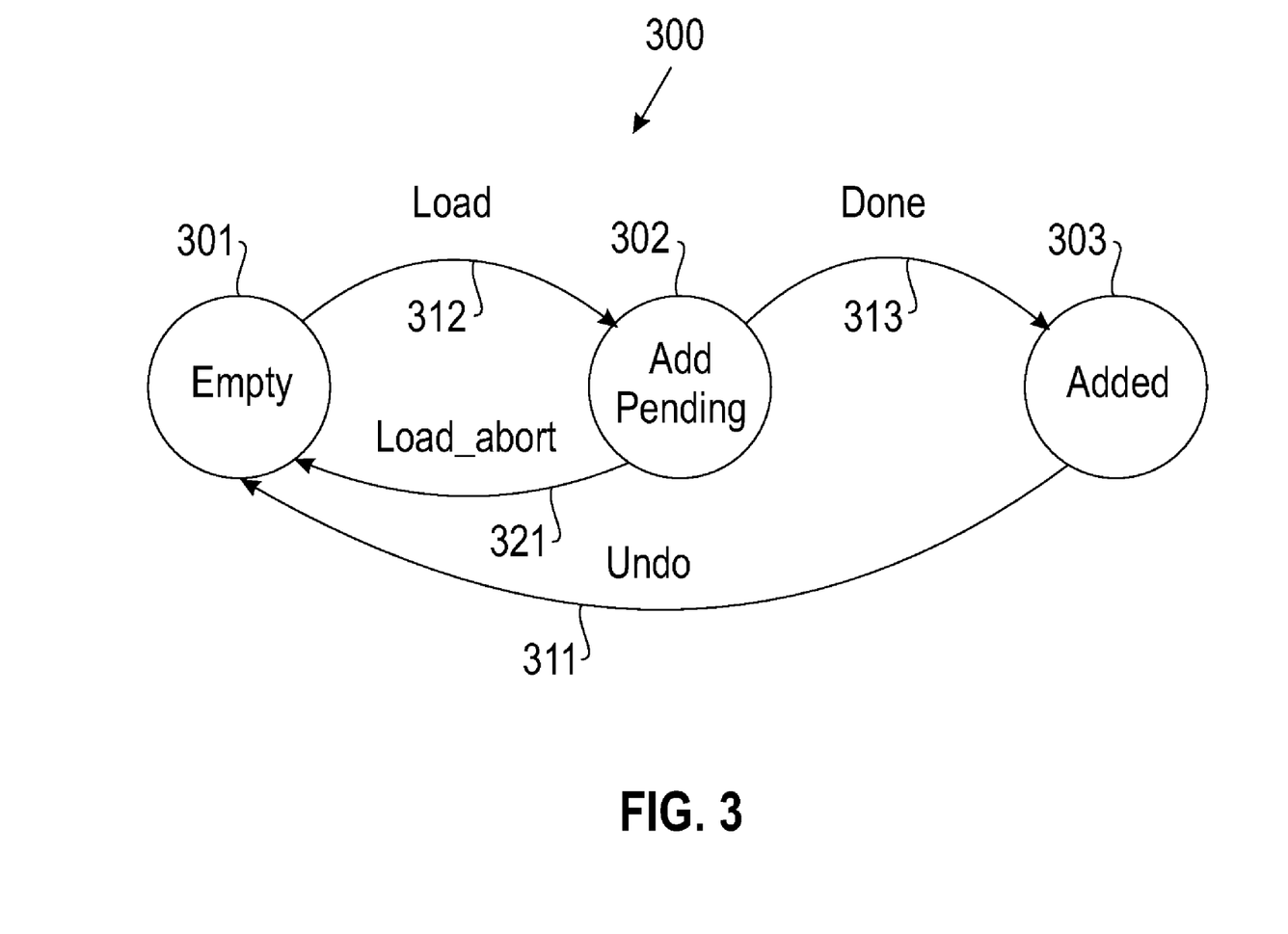
FIG. 3 is a state transition diagram for data loading in accordance with one embodiment of the present invention.

FIG. 3 shows a simple, by way of example, state-transition diagram 300 with three states 301, 302, and 303 and two checkpoints, which may be states 301 and 303. In the example, each file (e.g., block 103) to be loaded into the information warehouse 104 may have one of the three states 301, 302, and 303 as indicated in FIG. 3, "Empty" (state 301), "Add Pending" (state 302), and "Added" (state 303). Initially, before the file (each block 103) is loaded into the information warehouse 104, its state in the information warehouse may be "Empty" state 301 since there are no data (from the current block 103) loaded into the warehouse 104 yet. Once the file (e.g., current block 103) is being loaded, but not completely loaded yet, its state may become "Add Pending" state 302 as indicated by state transition 312 labeled "Load". Only when the entire file (e.g., current block 103) is completely loaded, may its state become "Added" state 303 as indicated by state transition 313 labeled "Done". Thus, it is seen that the state transitions (e.g., Load, Done, Load Abort, Undo) may be triggered based on the actions (e.g., operations 101) as indicated by FIG. 3. A "Load" command (e.g., performed by a bulk loading operation 105) may turn the state of the current block 103 from "Empty" state 301 to "Add pending" state 302 and the state may be entered into the pending log 108 (e.g., a system table such as Table 1). A "Done" command (e.g., performed by a bulk loading operation 105) may turn the state from "Add Pending" state 302 to "Added" state 303 and the state may be entered into the checkpoint log 114 (e.g., a system table such as Table 1). Added data can be "undone", as indicated by state transition 311 labeled "Undo", in case there are some errors in the data load (e.g., performed by a bulk loading operation 105) to the "Empty" state 301 as if the data (current block 103) were never loaded before. "Add Pending" state 302 also can return to "Empty" state 301 when the loading is explicitly "aborted" or aborted due to failures in the system" as indicated by state transition 321 labeled "Load_abort". In the current example, only "Empty" state 301 and "Added" state 303 are checkpoints in the system 100. The inventive failure recovery mechanism may always resume from the last checkpoint (e.g., state 301 or state 303 of the current block 103). Checkpoints may be considered to be the points where the information warehouse 104 is deemed to be consistent. At run time, the system 100 may track state changes (such as state transitions 311, 312, 313, and 321) in a system table (such as Table 1) and record checkpoints in a checkpoint log file (such as checkpoint log 114) accordingly.

The unit of the data that goes through such state-transitions need not be the entire source file 102 nor a block 103. Instead, the unit of data on which state transitions operate as illustrated above can be at the individual record level if a source file contains multiple records. In such a case, an additional mechanism may be provided to handle record level recovery and resumption. For instance, if a source file 102 contained some X number of records, and users wish to resume the failed load of such a file after loading some Y number of records, additional information may be recorded in the system table (e.g., Table 1) using an example of the information warehouse 104 as shown in Table 1:

If a failure occurred during data load, the tables (e.g., as shown in FIG. 2) may be inconsistent. For instance, the Fact table 201 may have 510 tuples (indicated in "Count" column, first row of Table 1), but the Sales.Map table 202 may have 502 tuples (indicated in "Count" column, second row of Table 1). The "resume" and "abort" mechanism employed by information warehouse system 100 should, for data consistency and integrity, delete the extra rows in the Fact table 201 before resuming data loading. To support such cases, the system table (Table 1) may be augmented to track several additional pieces of information. For example, a "Table name" column may be added to track the table changes; an "Attribute name" column may be added to indicate which table attribute (or column) must be monitored for changes; a "Count" column may be used to track the number of records inserted in the table whose "Table name" appears in the same row of Table 1;

a date and time ("Datetime" column) may track when the record is updated; and a "State" column may track the state of the data load. The combination of "Table name", "Count", "Attribute name", and "State" may enable the system 100 to determine from where the resumption can begin and which records in which tables must be cleaned up before the resumption.

Figure 4:
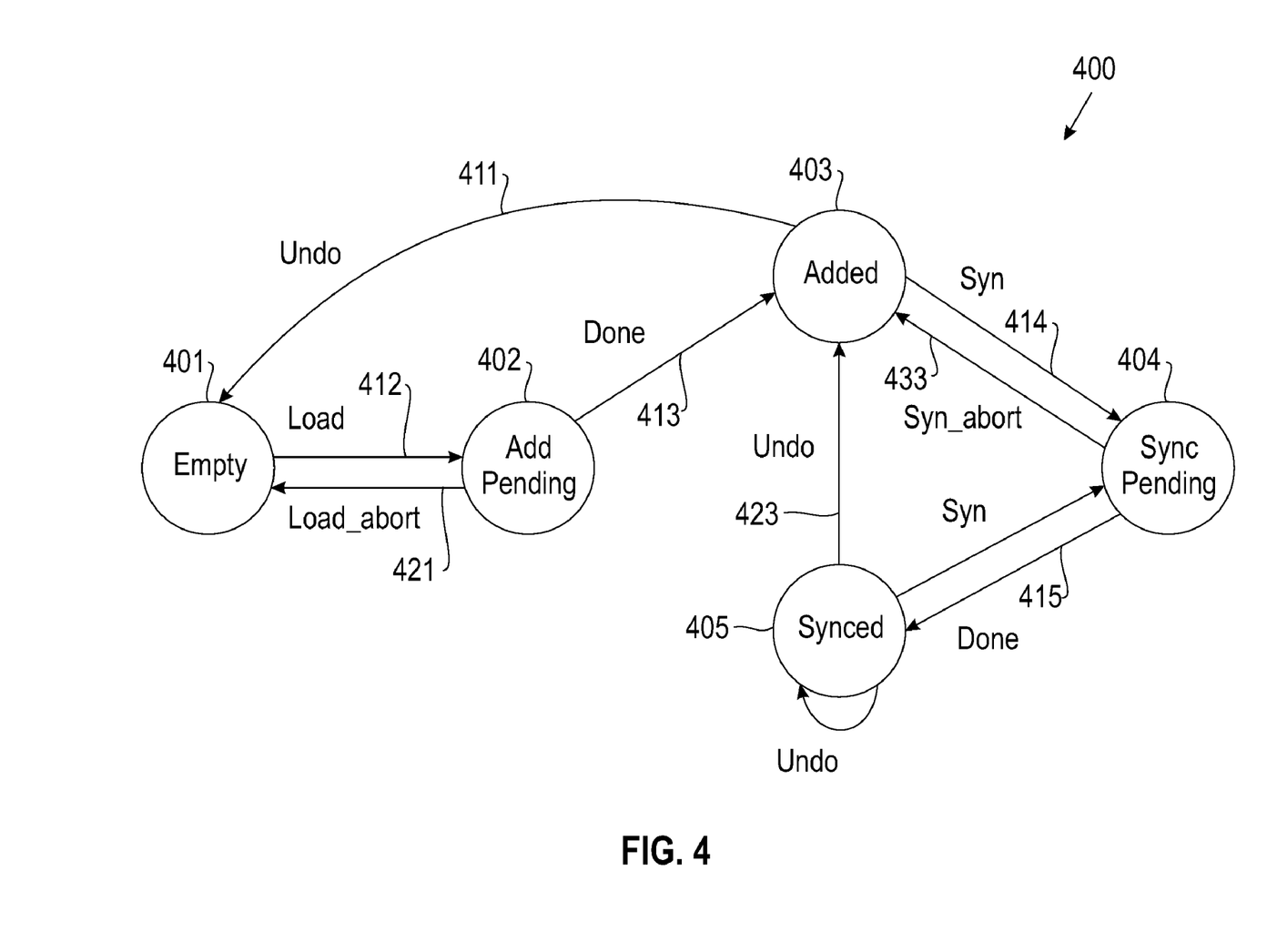
FIG. 4 is a state transition diagram for data loading in accordance with an alternative embodiment of the present invention.

The state-transition driven approach to information warehouse data loading, as illustrated by FIG. 3, can be applied in cases where system 100 may be more complicated, as illustrated by state transition diagram 400 shown in FIG. 4. FIG. 4 may include "Empty" state 401, "Add Pending" state 402, and "Added" state 403 along with state transitions 411, 412, 413, and 421, which may operate similarly to the similar states and transitions shown in FIG. 3. As FIG. 4 shows, more states, checkpoints, and state transitions can be added to the system 100. For instance, in FIG. 4, once a data file (e.g., current block 103) is loaded, its state may become "Added" state 403 in the system table (Table 1). However, there may be updates made to the source file 102 which require information warehouse system 100 to synchronize the changes from the source file 102 to the information warehouse 104. When the source file 102 is being synchronized ("synced") into the information warehouse 104, the state may be changed from "Added" state 403 to "Sync Pending" state 404 as indicated by state transition 414 labeled "Syn". Only when the synchronization (represented by state transition 414) is completed, the state may be changed to "Synced" state 405 as indicated by state transition 415 labeled "Done". Users of system 100 can, if they want to revert the changes, for example, undo (as indicated by state transition 423 labeled "Undo") a synchronized change to its previous state—"Added" state 403. If synchronization failed in the middle, a synchronization "abort" (as indicated by state transition 433 labeled "Syn_abort") can be performed and resumption can be done from "Added" state 403. For the state transition diagram of FIG. 4, "Empty" state 401, "Added" state 403, and "Synced" state 405 may be the checkpoints in the system 100. Such a state-transition driven approach to information warehouse data loading utilizing a system table, coupled with checkpointing, may enable users of system 100 to abort and resume data loading from the failure points during data loading without recourse to beginning the entire data load over again.

In addition, the state-transition driven approach to information warehouse data loading coupled with versioning may enable undo and redo operations that enable users of system 100 to recover from erroneous data loads or data loads containing faulty content. For example, undo operations may often be useful if a user of system 100 had wrongly made some changes to the loaded data and would like to rollback to an earlier version. A redo operation may be useful if the undo operation did not complete properly and the user of system 100 wants to go back to the state of the information warehouse 104 before the undo operation took place. Typically, for information warehouse data changes, undo and redo operations often operate on the individual source file data bases (e.g., source data 102). For example, a user of system 100 might find that a source data file 102 needs to be changed and reloaded or the changes need to be undone. For example, a data file 102 may be undone to an earlier version X, and new changes made to the data file 102, so that the new file version is Y. Then the changes may be synchronized into the information warehouse 104, and all intermediate versions of records in the data file 102 between version X and version Y may be deleted.

To support the undo and redo actions, system 100 may provide a versioning capability in the information warehouse 104. With the versioning mechanism, the system 100 normally may not overwrite or delete tuples from database (DB) tables (e.g., exemplified by Tables 3, 4, and 5) when the records are changed or deleted. Instead, additional versioning columns may be maintained in each of the information warehouse 104 DB tables. Moreover, a system table (e.g., exemplified by Table 2 and referred to as "source file version" table) may be used to track the version changes for each source data file 102. The following example uses Tables 2, 3, 4, and 5 to illustrate the workings of one embodiment of a versioning scheme for information warehouse system 100.

The example may assume that loading is done on a source file basis, e.g., that "file" refers to source data in the form of a data file 102. Each file may contain, for example, tens of thousands of records to be loaded into the information warehouse 104. The information warehouse system 100 may maintain a source file version table (Table 2) that tracks the versions of each source file (e.g., a.xml, b.xml, c.xml, d.xml) as shown in Table 2. There may be two version numbers that the system tracks, i.e., the "Current version #" which indicates the currently valid version of the file and the "Maximum version #" which indicates the maximum version number to which the file has ever been changed. The maximum version number of a file may be larger than the current version number if an undo operation has been done and there has been no subsequent change made to that file (for example, "c.xml" in Table 2).

For example, when a file is loaded into the information warehouse for the first time, both of its current version number and maximum version number may be set to 1. Each time a change is made to the file, its current version number may be incremented by 1, and so may the maximum version number be incremented by 1. For instance, the four sample files in Table 2 indicate that a.xml's current version is 1 and it has not been changed after the initial load, so the maximum version number is also 1. The sample file b.xml has been changed once, so its current version number and maximum version number are both 2 in Table 2. A source file's current version number may be smaller than the maximum version number if the changes to that file have been undone, as shown by Table 2 in the row for c.xml. In this case, c.xml has been changed 3 times, so its maximum version number is 4 in Table 2. But a user may have wanted to undo the changes and revert to the state as version 2, so the current version number may be 2 while the maximum version number may be 4. If a user were to make additional changes to c.xml and load that to the information warehouse 104, then c.xml's current version number and maximum version number may both become 3. Thus, it may be appreciated that the version numbering is a sequential ordering of versions; that any sequential ordering scheme—such as lettering A, B, C, . . . —could be used; that terms such as "less than" and "greater than" may refer in the usual way to the sequential ordering (e.g., "less than" meaning beforehand in the sequential ordering); that "maximum version number" may refer to the latest (in the sequential ordering) value in the scheme assigned to the file; and that "current version numbering" may refer to the latest (chronologically) value in the scheme assigned by the versioning method to the file.

TABLE 2

| Source data file | Current version # | Maximum version # |
| --- | --- | --- |
| a.xml | 1 | 1 |
| b.xml | 2 | 2 |

TABLE 2-continued

| Source data file | Current version # | Maximum version # |
| --- | --- | --- |
| c.xml | 2 | 4 |
| d.xml | 4 | 4 |

In addition to the source file version system table, each of the DB tables may also maintain additional information to allow efficient query, undo, and redo operations. More specifically, as shown in Table 3, each DB table may contain a "Source data file" column which may match, for each file, with the source file version table's "Source data file" column. Each source data file may contain multiple records so that, as shown in Table 3, a.xml may have 3 records, i.e., RecA, RecB, RecC. The DB table (Table 3) may also contain a "Creation version #" which may indicates which version of its file each record was created in. For instance, initially, a.xml may only contain RecA and RecB so that, when the file a.xml was first loaded, RecA and RecB were inserted into the DB table (Table 3) and their creation version numbers were set to 1. After that initial load, a.xml may have been changed to contain an additional record "RecC". So a.xml's version will be version 2, and RecC is created in that version. As a result, the creation version number (in the "Creation version #" column) for RecC may be set to 2 in the DB table (Table 3).

TABLE 3

| Source data file | Record ID | Creation version # | Deletion Flag |
| --- | --- | --- | --- |
| a.xml | RecA | 1 | 0 |
| a.xml | RecB | 1 | 0 |
| a.xml | RecC | 2 | 0 |
| b.xml | RecX | 4 | 0 |

Similarly, if a.xml is changed again so that RecA is modified, then the DB table should look like Table 4, as shown below. That is, a new RecA record may be added to the DB table with the creation version number set to be 3.

TABLE 4

| Source data file | Record ID | Creation version # | Deletion Flag |
| --- | --- | --- | --- |
| a.xml | RecA | 1 | 0 |
| a.xml | RecB | 1 | 0 |
| a.xml | RecC | 2 | 0 |
| b.xml | RecX | 4 | 0 |
| a.xml | RecA | 3 | 0 |

To support record deletions in this (first) variation of versioning, one more column, "Deletion Flag", may be added to the DB table as shown in Tables 3 and 4. The deletion flag may be used to indicate if a record has been deleted or not. By default when the records are inserted into the DB tables, the deletion flag may be set to be 0 (false). If a record is deleted from the source file, the deletion flag for that record may be set to 1 (true). For instance, following the earlier example (see Table 4), if source file a.xml is changed again after version 3 and the changes include both removal of RecA and addition of another record RecD, then the version number for a.xml may be updated to 4, and the DB table may be updated so that it appears as in Table 5. The deletion flag may serve as a "logical deletion" mechanism to allow the system 100 to detect if a record has been deleted and to return correct search results while still allowing system 100 to revert to an earlier version before the record was deleted.

TABLE 5

| Source data file | Record ID | Creation version # | Deletion Flag |
| --- | --- | --- | --- |
| a.xml | RecA | 1 | 0 |
| a.xml | RecB | 1 | 0 |
| a.xml | RecC | 2 | 0 |
| b.xml | RecZ | 4 | 0 |
| a.xml | RecA | 3 | 0 |
| a.xml | RecA | 4 | 1 |
| a.xml | RecD | 4 | 0 |

During run time, in response to a user of system 100 issuing a search query, the valid version for a given record (e.g. RecA, RecB, etc.) may be calculated as the maximum creation version number that is less than or equal to the current version number of the source data file (e.g., a.xml, b.xml, etc.) for that record if the deletion flag is 0. If the deletion flag is 1, the query result for that record may be NULL. For instance, in Table 5, the valid query result for RecA may be NULL, since RecA's deletion flag for the most recent version (creation version number 4) is set to 1. For RecB, RecB has never changed since the first version of a.xml, so the valid version for RecB may be version 1. For RecC, the current version of RecC may be version 2 as shown in Table 5. If, for example, a.xml were to be updated again (version 5) and this time the change were made to RecC, the most recent version of RecC, creation version 5 (not shown in Table 5) should be returned as the query result to the user of system 100 if RecC is being searched. Since the updates to the source files (e.g., a.xml, b.xml, etc.) do not occur frequently, one may not expect many versions of data for each record in the DB table. Most records will probably contain one version. As a result the query time performance will not see significant degradation with the additional calculation as described above in most cases.

Undoing changes to a file can be easily supported under the first variation of versioning: First, the system source file version table (e.g., Table 2) may update the file's corresponding current version number to the version to which a user of system 100 wishes to undo. For instance, if the user of system 100 wants to undo changes made to a.xml to its state in version 2, then the current version number for a.xml in the source file version table (e.g., Table 2) may be changed to 2 and the maximum version number (4, using Table 5 to illustrate this example) may remain unchanged. At the runtime query time, the system 100 may only return records whose creation version numbers are less than or equal to 2 and whose deletion flags are 0. If after a.xml has been reverted back to version 2, more modifications were made to a.xml, the system 100 may delete from the DB tables all the records that belong to a.xml and whose version numbers are larger than 2, and add the new records as version 3 and update the current version number and the maximum version number in the source file version table (e.g., Table 2) to 3. This operational semantic is equivalent to rollback operations. In other words, redo can only take place if a user of system 100 had undone changes to a file (e.g., a.xml) but decided to go back to the newer version before any changes were made to the older version of the file. Such a course could be desirable to a user of system 100, for example, if the undo operation had some issues. For instance, the user might want to undo a.xml from version 4 to version 2, but after the undo was completed, the user might want to go back to version 4 before making any changes. Such a redo operation can be easily supported by changing the current version number in the source file version table for a.xml to the maximum version number, e.g., 4, reverting to the previous value of the current version number. No additional operations would be needed.

There are other variations of versioning that can be used depending on the workload characteristics. If, for example, there are many updates to the source files (e.g., a.xml, b.xml, etc.), the DB tables may contain many versions for the same data. To ensure high performance during runtime queries, the first variation of versioning may impose calculations and selection of the correct version at query time as described above. An alternative variation of versioning can be devised that may require less calculation at query runtime but more overhead at record update, undo and redo time. For example, the "Deletion Flag" can be replaced by a "Flag", which can have three values: 0 meaning the record is active, 1 meaning deleted, and 2 meaning inactive. When a record is updated in a new version of a file, the flag of the record with the old version may be set as 2 ("inactive") and the flag of the record with the new version may be set as 0 ("active"). Under this variation of versioning, the query may be accomplished by returning only the version whose flag is 0, i.e., active. A proper indexing (as apparent to one of ordinary skill) on the DB columns could ensure faster retrieval than the earlier (first) variation of versioning, which requires a calculation of the maximum version number. The tradeoff, however, is that updates, and undo and redo actions may be more expensive. For example, in undo, if the system 100 changes a file version from 5 to 2, all version 2 records whose flags are 2, i.e., inactive, must be changed to active, i.e., set flag to 0. Similarly, version 5 records' flags must be changed to inactive, i.e., set to 2. Redo may be similar; for example, if system 100 changes version from 2 to 4, version 2 records' flags should be changed to inactive and version 4 records' flags should be changed to active. Also, for example, updates to the records may require changing of some active records to inactive and marking the new record as active. Clearly, such a variation of versioning would reduce the runtime query overhead, but may be more expensive at the record update, undo and redo time.

All the above-described variations of versioning with their corresponding runtime query, update, undo and redo algorithms can ensure correctness of the operations, e.g., maintaining data integrity and consistency after an operation is performed. The different variations may, however, have different tradeoffs in runtime query performance and update, undo, and redo performance depending on the workload characteristics. Users of system 100 can decide to select one or another as needed for the workload characteristics encountered.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A method comprising:
   loading data from a plurality of source files into an information warehouse, the data loading being assigned a state of data chosen from the group consisting of: beginning, completing, aborting, undoing, syncing, sync-aborting, sync-completing, and sync-undoing;
   maintaining dependencies among multiple database tables affected by the data loading in said information warehouse by tracking a state of database table transition, said state of database table transition being selected as one of: empty, add pending, added synced and sync-pending, wherein the state of database table transition transitions from one state to another state in response to a condition of said data loading;
   performing checkpointing and versioning concurrently with said data loading, the checkpointing ensuring consistency among said multiple database tables, wherein checkpoints are maintained in a checkpoint log file and said versioning comprises:
      assigning a current version number to each of the plurality of source files; and
      keeping track of a maximum version number for each of the plurality of source files that is a maximum of the assigned current version numbers for the source file;
   tracking a number of records associated with each data stored in each of the multiple database tables;
   recovering from a failure in the data loading using the checkpointing by restoring the information warehouse to at least one of said checkpoints, wherein said restoring comprises;
      avoiding duplicate data loading by determining a data item having a consistent number of records in each of said multiple database tables from data associated with said at least one checkpoint,
      removing data from said multiple database tables having an inconsistency in their corresponding number of records; and resuming the data loading from a point to which the information warehouse has been restored; and processing an undo operation of the loaded data from a current version to a previous version in response to an error in data loading using said versioning wherein said undo operation comprises:

updating the current version number of one of said plurality of source files to a chosen version number less than the maximum version number for the source file; and leaving the maximum version number for the source file unchanged.

2. An information warehouse system comprising:

a source file version table, including information for:

a source file name for each source file of the information warehouse;

a current version number of the source file; and a maximum version number equal to the maximum value that the current version number for the source file has been assigned;

a plurality of individual data base tables each of which contains versioning information in addition to data base information, the versioning information including:

a source file name for each source file of the information warehouse;

a creation version number for each record of the source file; and a deletion flag for each creation version of each record of the source file; and a versioning mechanism that accesses the source file version table and any combination of the data base tables to perform update, undo, and redo operations of data loading for the information warehouse, the versioning mechanism updates information in the source file version table and the data base tables according to at least one scheme selected from the group consisting of a first scheme and a second scheme, the scheme being chosen according to different workload characteristics encountered by the information warehouse system.

3. A computer program product for use with an information warehouse, the computer program product comprising:

a computer readable storage medium having computer readable code embodied therewith, the computer readable program code comprising:

computer readable program code running on the information warehouse, wherein the information warehouse comprises a computer, and the computer readable program code is configured to process a data loading task according to a state transition diagram that has checkpoint states;

computer readable program code configured to track state transitions among states of the state transition diagram using a system state table, the system state table includes:

states of the data loading task wherein each state of the data loading task is a state of the state transition diagram;

information to locate data base tables that the loading task affects and are dependent;

information to locate data base table attributes of the DB tables that have a dependent relationship;

information to locate a source file loaded by the data loading task; and a record loading count for each of the data base tables, said tracking includes recording a checkpoint state of the data loading task only after all dependent data base tables are updated consistently, wherein in response to a data loading failure completing the data loading task comprises:

computer readable program code configured to examine a checkpoint log and the system state table to identify a checkpoint state of the data loading task recorded previous to the data loading failure:

computer readable program code configured to resolve inconsistencies among records loaded by the data loading task; and computer readable program code configured to reload data from a most recent checkpoint state without generating duplicate records, while not requiring repeating the data loading task.

* * * * *